(12) United States Patent
Praharaj et al.

(10) Patent No.: US 10,999,449 B1
(45) Date of Patent: May 4, 2021

(54) METHOD AND APPARATUS TO MEASURE BLUR AND ADJUST PRINTER PARAMETERS IN RESPONSE TO BLUR

(71) Applicant: Xerox Corporation, Norwalk, CT (US)

(72) Inventors: Seemit Praharaj, Webster, NY (US); Jason Matthew LeFevre, Penfield, NY (US); Christine A. Steurrys, Williamson, NY (US); John T. Newell, Rochester, NY (US); David Alan Vankouwenberg, Avon, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/818,847

(22) Filed: Mar. 13, 2020

(51) Int. Cl.
*G06F 15/00* (2006.01)
*G06K 1/00* (2006.01)
*G06K 15/02* (2006.01)
*H04N 1/00* (2006.01)
*H04N 1/23* (2006.01)

(52) U.S. Cl.
CPC ..... *H04N 1/00034* (2013.01); *H04N 1/00005* (2013.01); *H04N 1/00082* (2013.01); *H04N 1/2323* (2013.01)

(58) Field of Classification Search
CPC .......... H04N 1/00034; H04N 1/00005; H04N 1/00082; H04N 1/2323
USPC ........................................... 358/1.1, 1.2, 1.9
See application file for complete search history.

(56) References Cited

U.S. PATENT DOCUMENTS

| | | | | |
|---|---|---|---|---|
| 2004/0190019 | A1* | 9/2004 | Li | H04N 1/6033 358/1.9 |
| 2005/0273753 | A1* | 12/2005 | Sezginer | G03F 7/70425 716/52 |
| 2010/0053699 | A1* | 3/2010 | Cahill | H04N 1/00063 358/474 |
| 2014/0063513 | A1* | 3/2014 | Enge | G06K 15/102 358/1.8 |
| 2014/0313256 | A1* | 10/2014 | Donaldson | B41J 2/515 347/19 |

* cited by examiner

*Primary Examiner* — Douglas Q Tran

(57) ABSTRACT

A method for measuring a blur of a print job and adjusting printer parameters in response to the blur is disclosed. For example, the method may be performed by a multi-function device (MFD) and includes printing an image on a print media, scanning the image, calculating a blur count for each location of the image in a cross-process direction, determining that the blur count for at least one location of the image is above a blur threshold, and adjusting at least one print parameter for a subsequently printed image on the MFD.

16 Claims, 8 Drawing Sheets

METHOD AND APPARATUS TO MEASURE BLUR AND ADJUST PRINTER PARAMETERS IN RESPONSE TO BLUR

The present disclosure relates generally to printing and, more particularly, to a method and apparatus to measure blur and adjust print jobs in response to the measured blur.

BACKGROUND

Various types of printers can be used to print images and text on print mediums. Different examples of printers may include inkjet, laser, and the like. Printers can have various transport paths to transport the print medium through the printer to receive the printing fluid or ink.

The mechanics of the transport path may affect print quality. For example, if there are mechanical imperfections in the transport path of the printer, the printing fluid may not be dispensed accurately at the desired locations of the print medium. This may lead to a degradation of the print quality.

SUMMARY

According to aspects illustrated herein, there is provided a method, non-transitory computer readable medium, and an apparatus for measuring a blur of a print job and adjusting printer parameters in response to the blur. One disclosed feature of the embodiments is a method that prints an image on a print media, scans the image, calculates a blur count for each location of the image in a cross-process direction, determines that the blur count for at least one location of the image is above a blur threshold, and adjusts at least one print parameter for a subsequently printed image on the MFD.

Another disclosed feature of the embodiments is a non-transitory computer-readable medium having stored thereon a plurality of instructions, the plurality of instructions including instructions which, when executed by a processor, cause the processor to perform operations that print an image on a print media, scan the image, calculate a blur count for each location of the image in a cross-process direction, determine that the blur count for at least one location of the image is above a blur threshold, and adjust at least one print parameter for a subsequently printed image on the MFD.

Another disclosed feature of the embodiments is an apparatus comprising a processor and a computer readable medium storing a plurality of instructions which, when executed by the processor, cause the processor to perform operations that print an image on a print media, scan the image, calculate a blur count for each location of the image in a cross-process direction, determine that the blur count for at least one location of the image is above a blur threshold, and adjust at least one print parameter for a subsequently printed image on the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to measure blur and adjust printer parameters in response to the blur. As discussed above, the transport path of some printers may affect the print quality. For example, if there are mechanical imperfections in the transport path of the printer, the printing fluid may not be dispensed accurately at the desired locations of the print medium. This may lead to a degradation of the print quality. Other potential causes of print quality degradation may be that the ejected drop volume has gone down, relative humidity (RH) has fallen, ink is drying faster at the nozzles, and the like.

In some printers, the transport path may include air flow to create a vacuum. The vacuum may hold the print medium in place as the print medium is moved through the transport path below the print heads. The print heads may dispense printing fluid or ink on desired locations on the print medium in accordance with the print job.

However, there may be gaps or spaces between sheets of the print medium that travel through the transport path. The gaps between the print mediums may create airflow disturbances along the trail edge and/or lead edge of the print medium. These disturbances can affect the ink drop placement and degrade print quality by creating blurry images.

The present disclosure provides a method and apparatus that can measure and detect blur caused by the disturbance in the gaps between sheets of the print medium. The measurement can then be used to adjust print parameters of the printer or multi-function device to help eliminate the blur. Some images may tolerate blur better than others. As a result, the present disclosure may be a customer selectable option much like missing jet correction.

Figure 1:
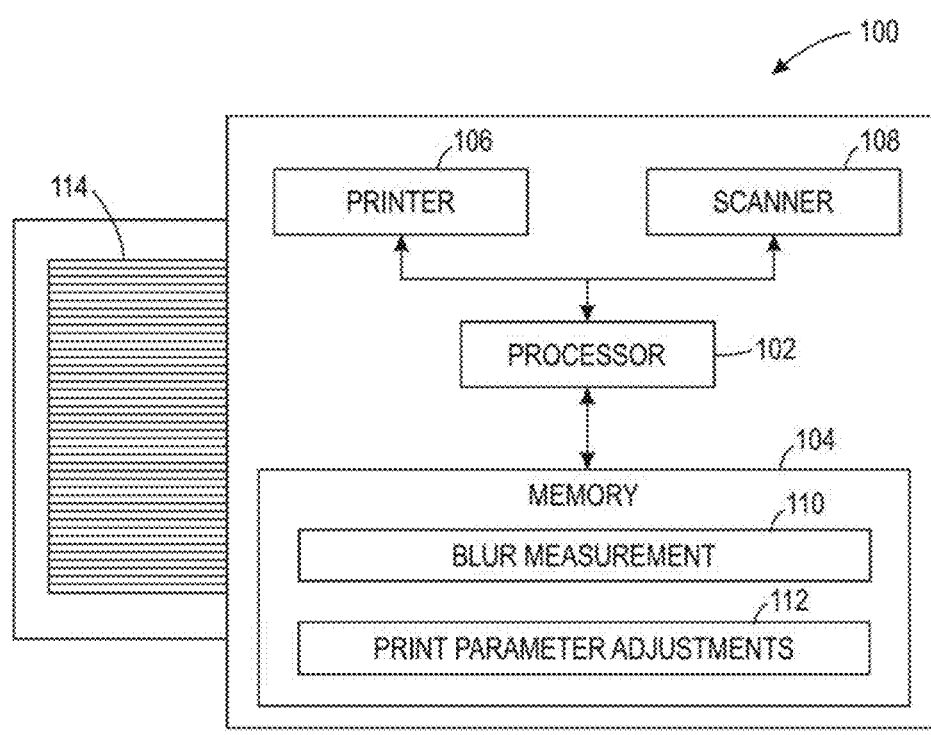
FIG. 1 illustrates a block diagram of an example apparatus of the present disclosure.

FIG. 1 illustrates an example apparatus 100 of the present disclosure. In one example, the apparatus 100 may be a multi-function device (MFD) that can print, copy, fax, scan, and the like. It should be noted that the apparatus 100 has been simplified for ease of explanation and may include additional components that are not shown.

In one embodiment, the apparatus 100 may include a processor 102, a memory 104, a printer 106, and a scanner 108. In one embodiment, the processor 102 may be communicatively coupled to the printer 106, the scanner 108, and the memory 104. The processor 102 may control operations of the printer 106 and the scanner 108. The processor 102 may execute instructions stored in the memory 104 to perform the functions described herein.

Figure 2:
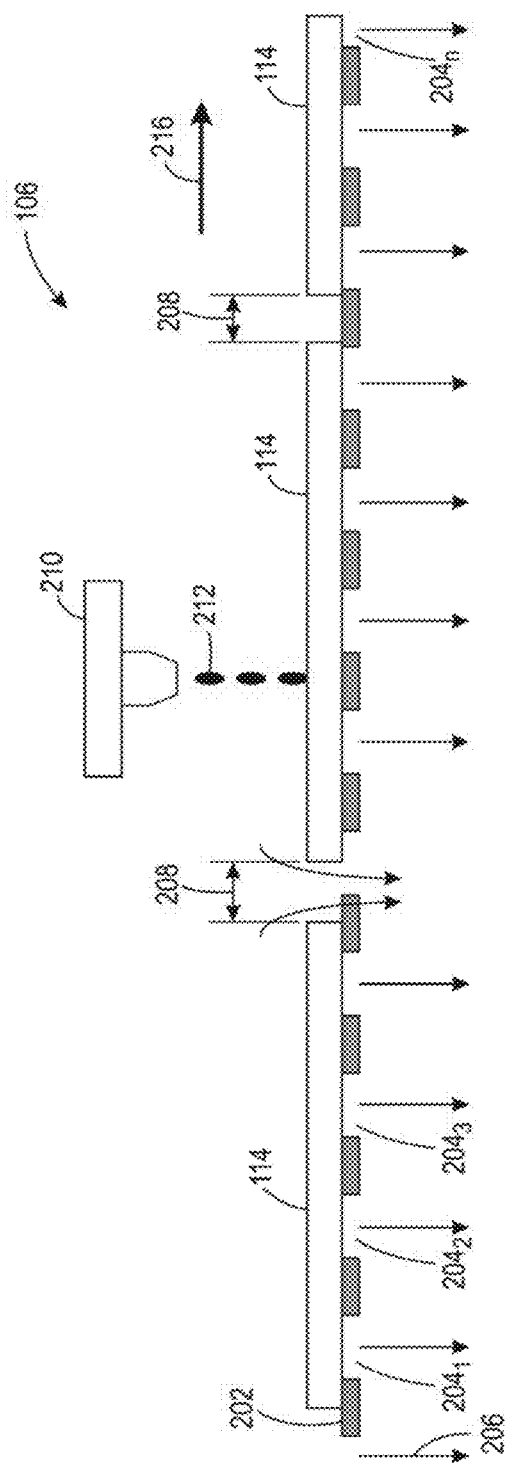
FIG. 2 illustrates a cross-sectional view of an example portion of a transport path of the apparatus of the present disclosure.

In one embodiment, the printer 106 may receive a print media 114 from a paper tray and print images onto the print media 114 in accordance with a print job. An example portion of the printer 106 is illustrated in FIG. 2, and discussed in further details below.

In one embodiment, the scanner 108 may scan images printed on the print media 114. The scanner 108 may include an optical reader, scanner, or device that can capture an image of the printed images on the print media 114 to be converted into electronic files that can be analyzed by the processor 102.

In one embodiment, the memory 104 may be a non-transitory computer readable medium. For example, the memory 104 may be a hard disk drive, a random access memory (RAM), a read-only memory (ROM), a solid state drive, and the like.

In one embodiment, the memory 104 may store instructions to perform a blur measurement 110 and instructions for print parameter adjustments 112. As discussed in further details below, the blur measurement 110 may contain instructions for the processor 102 to measure an amount of blur on images printed on the print media 114.

If too much blur is detected based on the measurements, the processor 102 may execute the print parameter adjustments 112. In other words, the print parameter adjustments 112 may help to reduce the amount of blur to an acceptable level. Examples of print parameter adjustments 112 that can be made may include adjustments to the image that is printed or adjustments to parameters of the apparatus 100 or the printer 106. For example, the size of the image can be modified to reduce blur, the location of image on the print media 114 can be adjusted to reduce blur, an amount of air flow (discussed in further details below) in the printer 106 can be adjusted to reduce blur, a speed of the print media 114 moving through the printer 106 can be adjusted to reduce blur, and so forth.

FIG. 2 illustrates a cross-sectional view of an example portion of a transport path of the printer 106 in the apparatus 100 of the present disclosure. It should be noted that the transport path has been simplified for ease of explanation. The transport path may include additional components that are not shown. For example, the transport path may include rollers, nips, air ducts, fans, and the like.

In one embodiment, the printer 106 may include a transport belt 202. The transport belt 202 may include a plurality of openings $204_1$ to $204_n$ (hereinafter also referred to individually as an opening 204 or collectively as openings 204). In one embodiment, air flow 206 may be fed through the openings 204 to create a vacuum. The vacuum may hold the print media 114 onto the transport belt 202.

As the transport belt 202 may move the print media 114 in a process direction (as shown by an arrow 216). As the print media 114 is moved, a printhead 210 may dispense a print fluid 212 onto desired locations of the print media 114. The print fluid 212 may be dispensed in accordance with a print job and controlled by a controller (e.g., the processor 102).

In one embodiment, the print fluid 212 may be ink. Although a single printhead 210 is shown, a plurality of different printheads 210 may be deployed. Each printhead 210 may dispense a different colored print fluid 212. For example, the different colors may include cyan, magenta, yellow, and black.

When multiple pages or sheets of the print media 114 are moved on the transport belt 202, the print media 114 may be spaced apart to form gaps 208 between consecutive sheets of the print media 114. The air flow around these gaps 208 can cause disturbances on a lead edge and a trail edge of the print media 114. The disturbances (discussed in further details below) can create blur. The present disclosure may quantify or measure the amount of blur, determine if the amount of measured blur is unacceptable, and perform print parameter adjustments in response to determining that the amount of measured blur is unacceptable.

Figure 3:
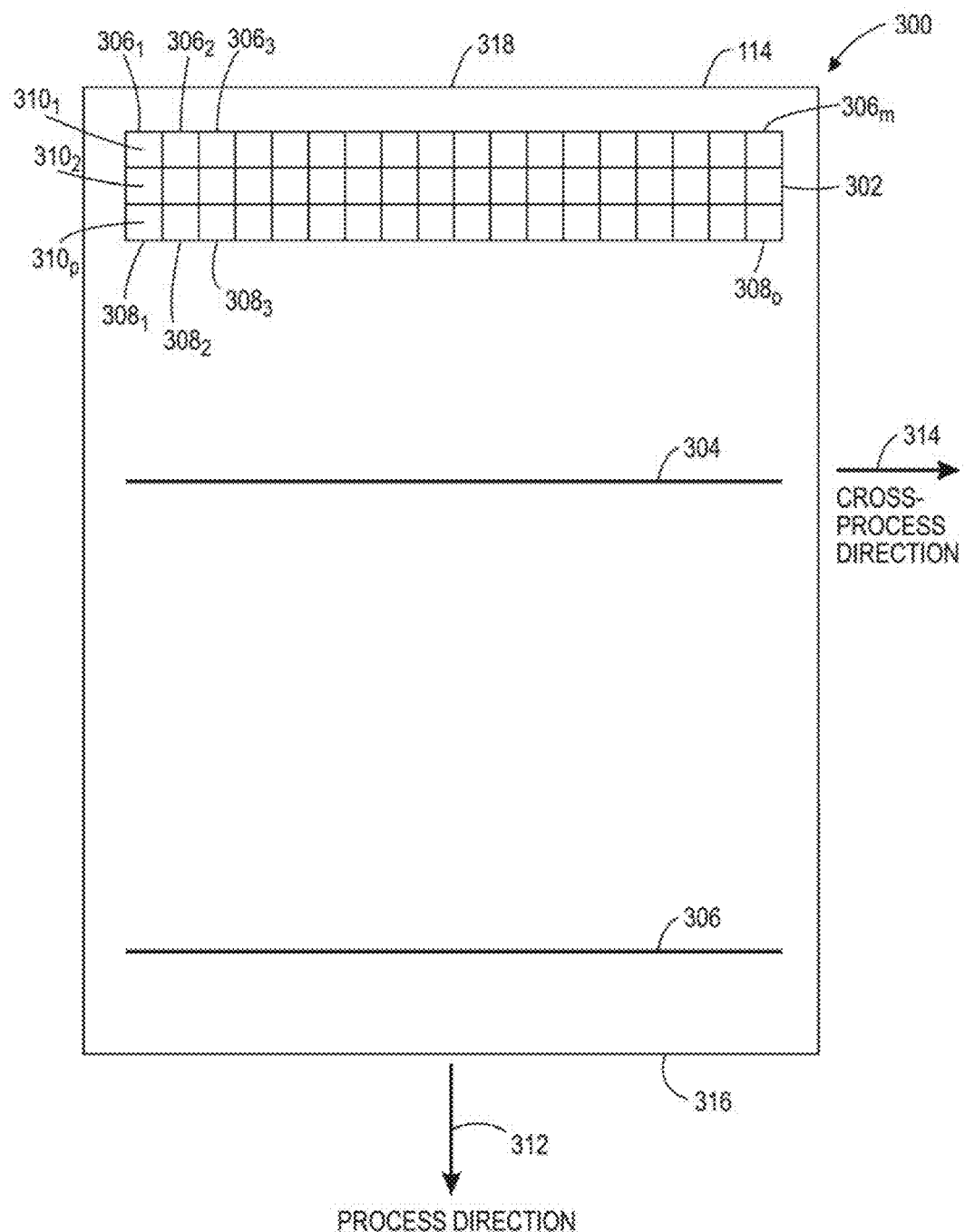
FIG. 3 illustrates an example diagram of a print medium and labeled portions of the print medium of the present disclosure.

FIG. 3 illustrates an example 300 of printed images 302, 304, and 306 on the print media 114. In one embodiment, the apparatus 100 may print images 302, 304, and 306 to measure an amount of blur. If too much blur is detected, the print parameter adjustments 112 may be executed to reduce the amount of blur for subsequent print jobs. In other words, the example 300 may be printed when initializing the apparatus 100, before starting a new print job, performed periodically, and the like.

In one embodiment, the images 302, 304, and 306 may be lines that are printed along a cross-process direction 314. The trail edge line 302 may be printed along or near a trail edge 318 of the print media 114. The middle line 304 may be printed near a middle of the print media 114. The lead edge line 306 may be printed along or near the lead edge 316 of the print media 114.

The trail edge line 302 is expanded to illustrate how the lines 302, 304, and 306 may be comprised of a plurality of pixels $306_1$ to $306_m$ (hereinafter also referred to individually as a pixel 306 or collectively as pixels 306). The pixels 306 may be printed in a plurality of columns $308_1$ to $308_o$ and rows $310_1$ to $310_p$. The illustration of the pixels 306 may help illustrate how the blur is measured, as discussed in further details below.

As noted above, the print fluid 212 may be dispensed at desired locations. A drop of the print fluid 212 may be dispensed at each pixel 306 to print the trail edge line 302 (similarly at each pixel of the lines 304 and 306 to print lines 304 and 306). Without any disturbances, the entirety of the drop of print fluid 212 may fall within a desired location of a pixel 306. However, when disturbances occur (e.g., along the lead edge 316 and trail edge 318 due to the gaps 208 illustrated in FIG. 2) satellites may be formed around the drop of print fluid 212.

Figure 4:
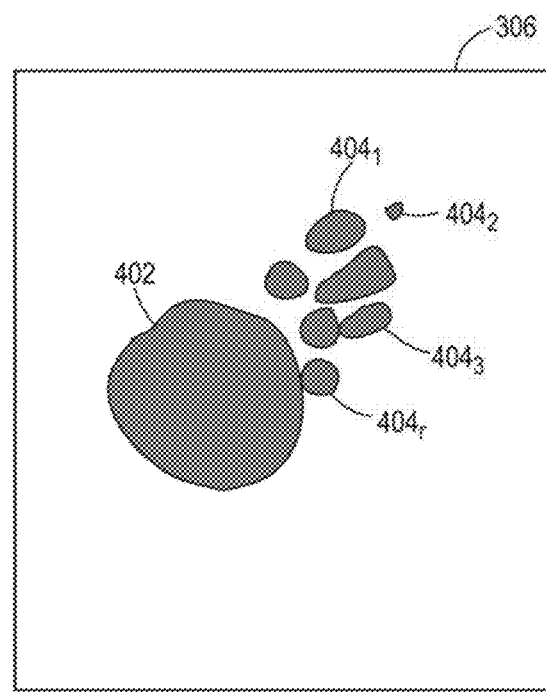
FIG. 4 illustrates an example of a drop of print fluid with satellites that can cause image blur of the present disclosure.

FIG. 4 illustrates an example of satellites $404_1$-$404_r$ (hereinafter also referred to individually as a satellite 404 or collectively as satellites 404). FIG. 4 illustrates a drop 402 of the print fluid 212 that is dispensed in a pixel 306 where a disturbance has occurred. For example, when no disturbance of the print media 114 occurs (e.g., towards a middle of the print media 114) the satellites 404 may all fall within the same location as the drop 402. Thus, the satellites 404 cannot be seen, or can be minimally seen, and no blurring of the image occurs.

However, when a disturbance of the print media 114 occurs, the satellites 404 may be "splattered" across the pixel 306 and away from the drop 402. The quality of the image being printed may be degraded when this occurs over several pixels 306. For example, portions of the image may become blurry.

Referring back to FIG. 1, the blur measurement 110 may include instructions that can quantify or measure the amount of blur to determine if an unacceptable amount of blur is present in a printed image. In one embodiment, the image can be printed on the print media 114 and then scanned by the scanner 108 for analysis. The scanner 108 may scan the print media 114 at a resolution of 2400 dots per inch (dpi). Other scanning resolutions may also be selected (e.g., 2100 dpi). The resolution that is selected may be selected to provide a balance between noise and accuracy (e.g., higher resolution produces more noise, but better accuracy, and lower resolution may provide less noise, but lower accuracy).

In one embodiment, the scanned image may be analyzed to calculate a reverse gray value for each pixel 306 in the process direction 312. In one embodiment, the reverse grayscale can be used where a value of 0 is white and a value of 255 is black. In other words, the greyscale of the pixels 306 in a column $308_1$ may be calculated.

Figure 5:
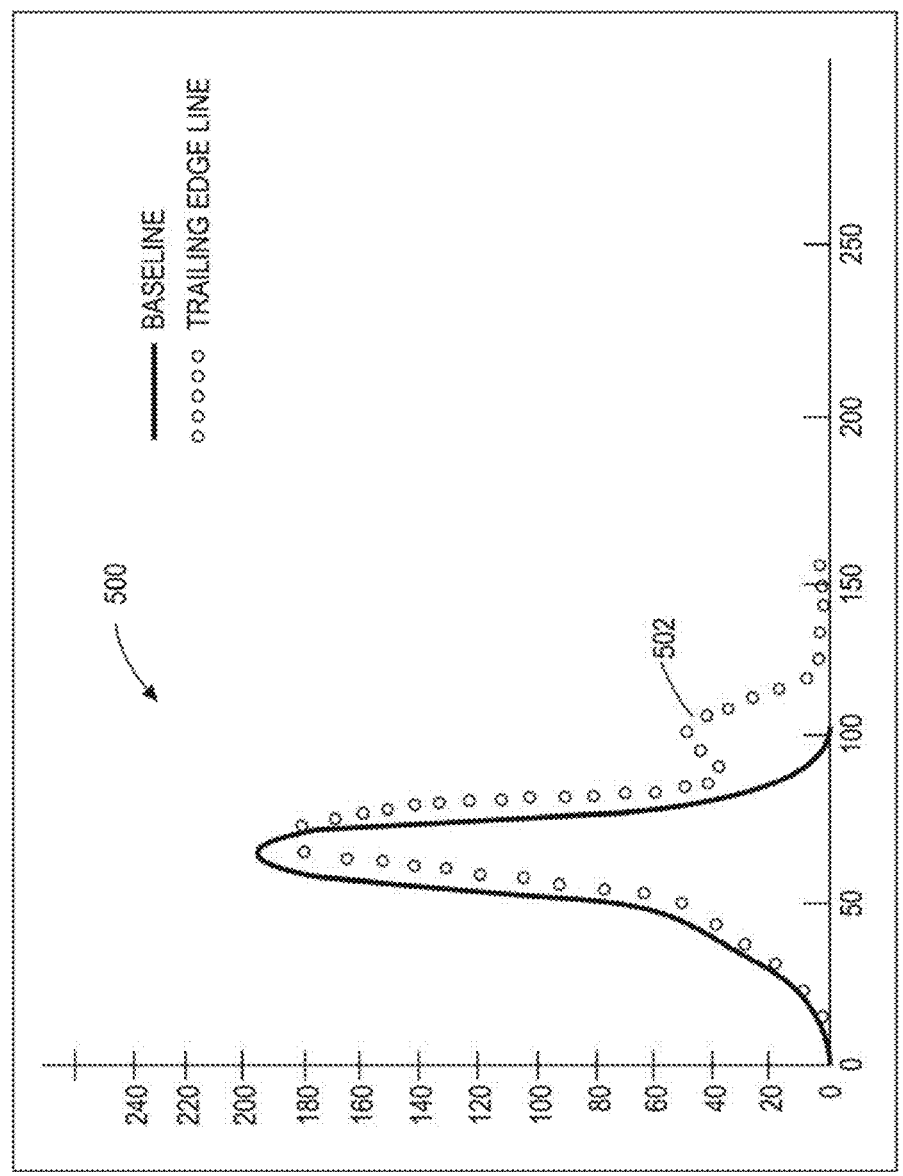
FIG. 5 illustrates example graphs of an image with no blur and an image with blur of the present disclosure.

FIG. 5 illustrates an example graph of the reverse gray values of the pixels 306 in a column 308 of the trail edge line 302. FIG. 5 illustrates a baseline graph compared to the graph of the trail edge line 302. As shown in FIG. 5, a line printed with no or minimal blur may initially have white pixels (e.g., no ink with a reverse gray scale value of 0). As the pixels 306 are analyzed in the process direction, the pixels may begin showing the print fluid 212 or darker pixels. Thus, the reverse grayscale value may gradually increase to a peak at the center of the trail edge line 302, and then fall off again to all white.

However, as shown in FIG. 5, when disturbances occur and the satellites 404 are splashed to neighboring pixels 306, the neighboring pixels may show some reverse gray values greater than 0. FIG. 5 shows a portion 502 of the graph where reverse gray scale values are measured where the pixels 306 should be white (e.g., a reverse gray scale value of 0).

The reverse gray scale value for each pixel 306 may be compared to a threshold. The threshold may be selected to indicate whether a pixel 306 contains print fluid 212 (e.g., possibly remnants of a satellite 404 splashed from an adjacent pixel). The threshold may be selected to exclude dark areas where it may be clear that a particular pixel was intended to receive print fluid 212, but low enough to capture the satellites 404. In one embodiment, a threshold value of 80 may be selected.

The reverse gray scale value for each pixel 306 may be compared to the threshold. A total number of pixels 306 that have a respective reverse gray scale value below the threshold may be calculated. This process may be repeated for each column 308 of pixels 306 along the cross process direction 314.

Figure 6:
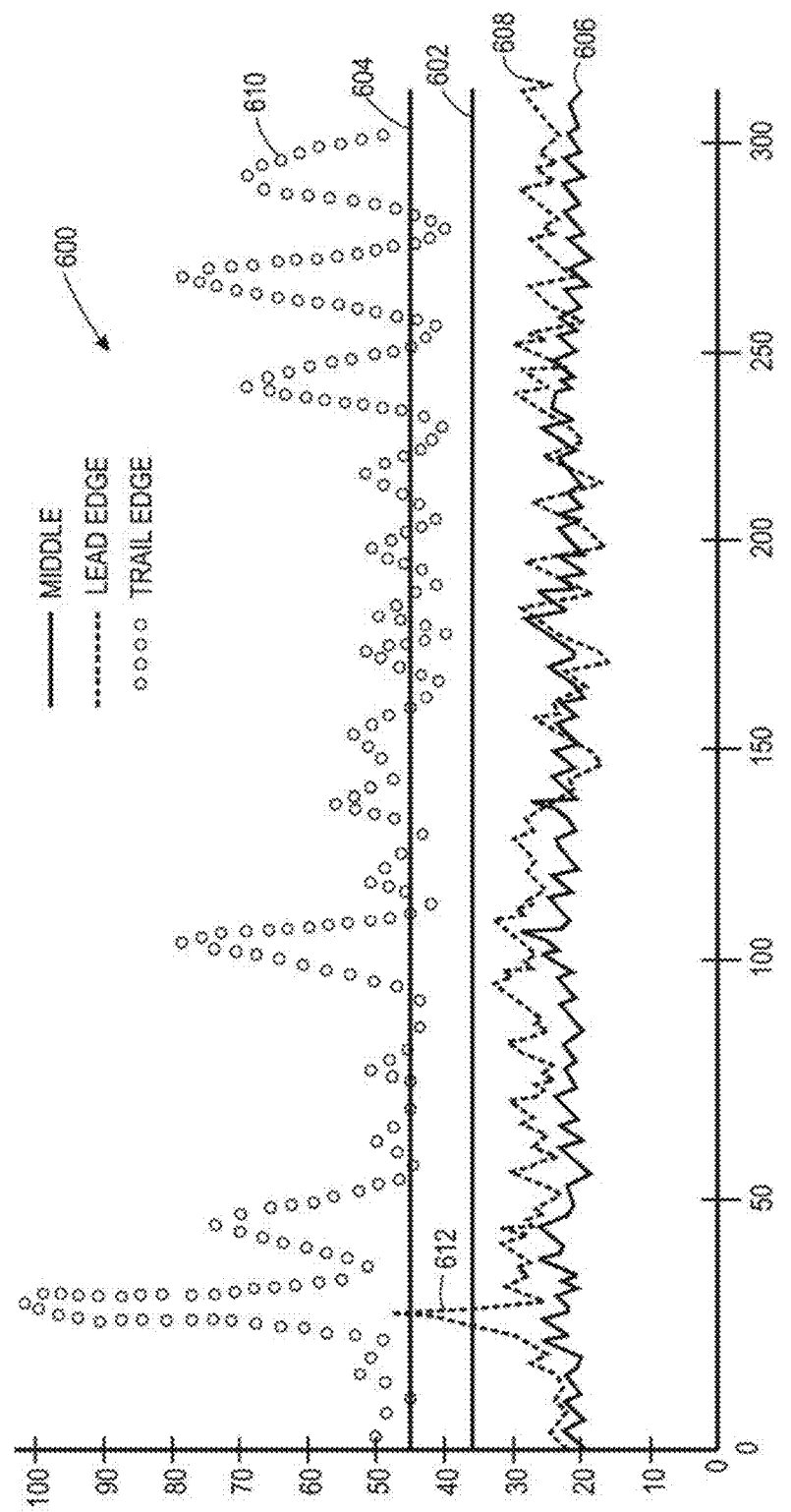
FIG. 6 illustrates an example graph from blur measurements of an image to detect blur of the present disclosure.

FIG. 6 illustrates an example graph of the number of pixels that are below the threshold value for the trail edge line 302, the middle line 304, and the lead edge line 306. In one embodiment, blur threshold values may be selected that indicate an acceptable amount of blur. In one embodiment, multiple threshold values may be selected to indicate a zone for no blur, a danger zone for blur, and a zone for unacceptable amount of blur.

FIG. 6 illustrates a threshold value 602 and a threshold value 604. However, as noted above, only the threshold value 602 can be used in one embodiment. In one embodiment, the threshold values 602 and 604 can be pre-defined. For example, an image may be examined with a known amount of pixels that have a reverse grayscale value below the threshold. Based on observation, a user may determine whether the amount of blur is unacceptable or acceptable. The process may be repeated with multiple images at different amounts of blur (e.g., different known amounts of pixels that have a reverse grayscale value below the threshold). At a certain point, the user may determine that the amount of blur goes from acceptable to unacceptable. The known amount of pixels that have a reverse grayscale value below the threshold at that certain point may be used as a threshold.

In FIG. 6, the graph 606 shows that no locations along the middle line 304 in the cross-process direction may have blur. The total number of pixels 306 in each column 308 that have a respective reverse gray scale value below the threshold (e.g., 80 using the example above) are above the threshold value 602.

The graph 608 indicates that a location along the cross-process direction 314 of the lead edge line 306 may have a blur issue as shown by a peak 612. The total number of pixels 306 that have a respective reverse gray scale value below the threshold at a location associated with the peak 612 exceeds the thresholds 602 and 604. Thus, blur may be detected at the location of the lead edge line 306 in the cross-process direction associated with the peak 612.

The graph 610 indicates that most locations along the cross-process direction 314 of the trail edge line 302 have a blur issue. As can be seen by the graph 610, most of the graph is above the threshold 604 indicating an unacceptable amount of blur.

In one embodiment, the print parameter adjustments 112 may be executed when an unacceptable amount of blur is measured in at least one column 308 of pixels 306. In one embodiment, the print parameter adjustments 112 may be executed when an unacceptable amount of blur is measured at a number of columns 308 of pixels 306 that exceeds an adjustment threshold. (e.g., 10 if there are 300 pixels in the cross-process direction, or a percentage (e.g., greater than 33%)).

In one embodiment, when the measured amount of blur is unacceptable, the print parameter adjustments 112 may be executed to eliminate blur for subsequently printed images. For example, the processor 102 may move the trail edge margin to be closer to the middle. In one example, the processor 102 may change location or a size of the subsequently printed images. In one example, the processor 102 may reduce an amount of airflow 206 in the printer 106. In one example, the processor 102 may slow the velocity of the transport belt 202, and so forth.

Figure 7:
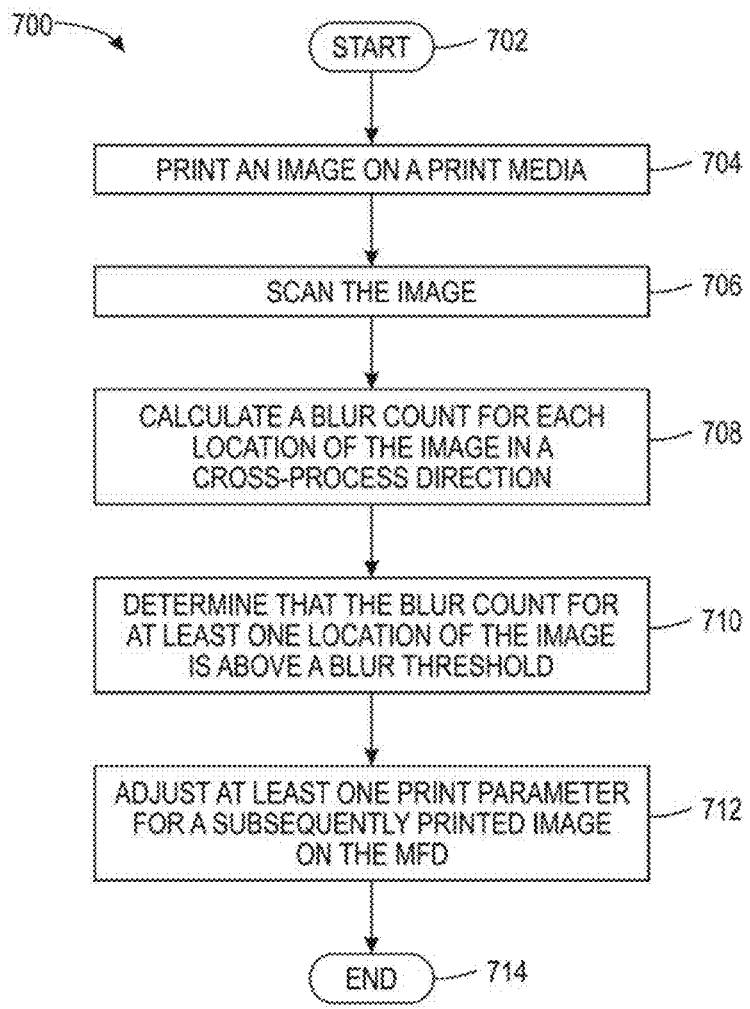
FIG. 7 illustrates a flowchart of an example method for measuring a blur of a print job and adjusting printer parameters in response to the blur of the present disclosure.
Figure 8:
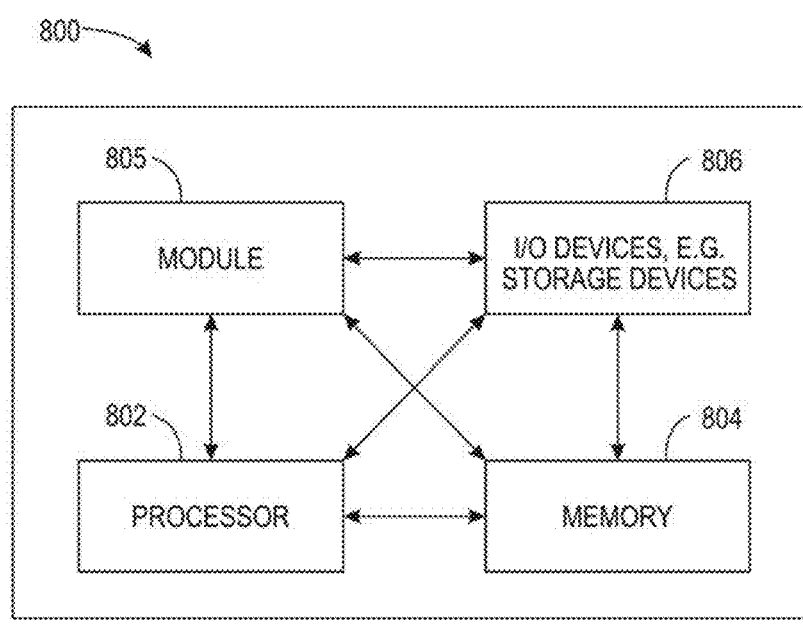
FIG. 8 illustrates a high-level block diagram of an example computer suitable for use in performing the functions described herein.

FIG. 7 illustrates a flowchart of an example method 700 for measuring a blur of a print job and adjusting printer parameters in response to the blur of the present disclosure. In one embodiment, one or more blocks of the method 700 may be performed by the apparatus 100, or a computer/processor that controls operation of the apparatus 100 as illustrated in FIG. 8 and discussed below.

At block 702, the method 700 begins. At block 704, the method 700 prints an image on a print media. For example, the image may be printed to measure an amount of blur at various locations on the print media. The image may be printed when the MFD is initialized, before a print job is executed, or periodically at any desired calibration time period.

In one embodiment, the image may be lines that are printed at different locations on the print media in a cross-process direction. For example, a line may be printed near a lead edge, a middle of the print media, and near a trail edge.

At block 706, the method 700 scans the image. For example, the images that are printed on the print media may be scanned. The scanned image of the printed images may be analyzed to measure an amount of blur at various locations along a cross-process direction of the image. The amount of blur that is measured may be compared to a blur threshold to determine if an unacceptable amount of blur is present.

At block 708, the method 700 calculates a blur count for each location of the image in a cross-process direction. For example, the calculation is explained with respect to FIGS.

5 and 6, as described above. In one embodiment, each column of pixels in the cross-process direction may be analyzed. For example, a reverse gray scale value (e.g., where white pixels=0 and black pixels=255) may be calculated for each pixel. Then a number of pixels in each column of pixels (e.g., in a process direction) that have a respective reverse gray scale value below a threshold may be calculated. The number of pixels that have a respective gray scale value below the threshold may be plotted for each column of pixels along the cross-process direction.

At block 710, the method 700 determines that the blur count for at least one location of the image is above a blur threshold. For example, the blur measurement or blur count may be associated with the number of pixels that have a respective gray scale value below the threshold. When the blur measurement or blur count is above a blur threshold, then an unacceptable amount of blur may be detected. The unacceptable amount of blur may be detected at a particular cross-process direction location along the image. In one embodiment, an unacceptable amount of blur may be detected at multiple locations along the cross-process direction of the image.

In one embodiment, blocks 708 and 710 may be repeated for multiple images. For example, if the images include a lead edge line, a middle line, and a trail edge line, the blocks 708, and 710 may be repeated for the lead edge line, the middle line, and the trail edge line.

At block 712, the method 700 adjusts at least one print parameter for a subsequently printed image on the MFD. For example, at least one print parameter may be adjusted to reduce or eliminate blur on the subsequently printed image. In one embodiment, the at least one print parameter to be adjusted may include moving the subsequently printed image on the print media towards a center of the print media (e.g., moving a trail edge margin from 3 millimeters to 9 millimeters), reducing a size of the subsequently printed image (e.g., reduce a height of the subsequently printed image to move a side of the subsequently image further away from an edge that has an unacceptable amount of blur), reducing an airflow in the transport path/printer of the MFD, and the like. At block 714, the method 700 ends.

FIG. 8 depicts a high-level block diagram of a computer that is dedicated to perform the functions described herein. As depicted in FIG. 8, the computer 800 comprises one or more hardware processor elements 802 (e.g., a central processing unit (CPU), a microprocessor, or a multi-core processor), a memory 804, e.g., random access memory (RAM) and/or read only memory (ROM), a module 805 for measuring a blur of a print job and adjusting printer parameters in response to the blur, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 805 for measuring a blur of a print job and adjusting printer parameters in response to the blur (e.g., a software program comprising computer-executable instructions) can be loaded into memory 804 and executed by hardware processor element 802 to implement the steps, functions or operations as discussed above in connection with the example method 700. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for measuring a blur of a print job and adjusting printer parameters in response to the blur (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   printing, via a multi-function device (MFD), an image on a print media, wherein the image comprises a line in a cross-process direction;
   scanning, by the MFD, the image;
   calculating, by the MFD, a blur count for each location of the image in a cross-process direction, wherein the calculating comprises:
      comparing a reverse gray value of each pixel of the line in a process direction to a threshold; and
      calculating a number of pixels that is below the threshold;
   determining, by the MFD, that the blur count for at least one location of the image is above a blur threshold; and
   adjusting, by the MFD, at least one print parameter for a subsequently printed image on the MFD.

2. The method of claim 1, wherein the threshold comprises a value between 0 and 255.

3. The method of claim 1, wherein the comparing and the calculating are repeated for each column of pixels of the line in the cross-process direction.

4. The method of claim 3, wherein the number of pixels that are below the threshold comprises the blur count for the at least one location of the image.

5. The method of claim 4, wherein the calculating is repeated for a trail edge line, a middle line, and a lead edge line of the image.

6. The method of claim 1, wherein the adjusting the at least one print parameter comprises moving the subsequently printed image on the print media towards a center of the print media.

7. The method of claim 1, wherein the adjusting the at least one print parameter comprises reducing a size of the subsequently printed image.

8. The method of claim 1, wherein the adjusting the at least one print parameter comprises reducing an airflow in a transport path of the MFD.

9. A non-transitory computer-readable medium storing a plurality of instructions, which when executed by a processor of a multi-function device (MFD), cause the processor to perform operations, the operations comprising:
   printing an image on a print media, wherein the image comprises a line in a cross-process direction;
   scanning the image;
   calculating a blur count for each location of the image in a cross-process direction, wherein the calculating comprises:
      comparing a reverse gray value of each pixel of the line in a process direction to a threshold; and
      calculating a number of pixels that is below the threshold;
   determining that the blur count for at least one location of the image is above a blur threshold; and
   adjusting at least one print parameter for a subsequently printed image on the MFD.

10. The non-transitory computer-readable medium of claim 9, wherein the comparing and the calculating are repeated for each column of pixels of the line in the cross-process direction.

11. The non-transitory computer-readable medium of claim 10, wherein the number of pixels that are below the threshold comprises the blur count for the at least one location of the image.

12. The non-transitory computer-readable medium of claim 11, wherein the calculating is repeated for a trail edge line, a middle line, and a lead edge line of the image.

13. The non-transitory computer-readable medium of claim 9, wherein the adjusting the at least one print parameter comprises moving the subsequently printed image on the print media towards a center of the print media.

14. The non-transitory computer-readable medium of claim 9, wherein the adjusting the at least one print parameter comprises reducing a size of the subsequently printed image.

15. The non-transitory computer-readable medium of claim 9, wherein the adjusting the at least one print parameter comprises reducing an airflow in a transport path of the MFD.

16. A method, comprising:
   printing, via a multi-function device (MFD), a lead edge line, a middle page line, and a trail edge line, wherein the lead edge line, the middle page line, and the trail edge line are printed in a cross-process direction on a print media;
   scanning, by the MFD, the lead edge line, the middle page line, and the trail edge line;
   comparing, by the MFD, a reverse gray value of each pixel in a process direction to a threshold for the lead edge line, the middle page line, and a trail edge line;
   calculating, by the MFD, a number of pixels that are below the threshold for the lead edge line, the middle page line, and the trail edge line;
   comparing, by the MFD, the number of pixels to a blur threshold for the lead edge line, the middle page line, and the trail edge line;
   repeating, by the MFD, the comparing each pixel in the process direction to the threshold, the calculating, and the comparing the number of pixels to the blur threshold for each column of pixels of the lead edge line, the middle page line, and the trail edge line in the cross-process direction;
   determining, by the MFD that at least one location of the lead edge line, the middle page line, or the trail edge line is above the blur threshold; and
   adjusting, by the MFD, at least one print parameter for a subsequently printed image on the MFD.

\* \* \* \* \*